US009787978B1

(12) United States Patent
Jokinen et al.

(10) Patent No.: US 9,787,978 B1
(45) Date of Patent: Oct. 10, 2017

(54) DISPLAY INSPECTION

(71) Applicant: OptoFidelity Oy, Tampere (FI)

(72) Inventors: Kimmo Jokinen, Tampere (FI); Hans Kuosmanen, Tampere (FI); Tommi Niemi, Tampere (FI)

(73) Assignee: OptoFidelity Oy, Tampere (FI)

( * ) Notice: Subject to any disclaimer, the term of this patent is extended or adjusted under 35 U.S.C. 154(b) by 0 days.

(21) Appl. No.: 15/332,503

(22) Filed: Oct. 24, 2016

(51) Int. Cl.
*H04N 17/00* (2006.01)
*G06T 3/00* (2006.01)

(52) U.S. Cl.
CPC .......... *H04N 17/004* (2013.01); *G06T 3/0006* (2013.01); *G06T 2210/22* (2013.01)

(58) Field of Classification Search
CPC .... H04N 17/004; H04N 17/02; H04N 17/002; H04N 17/00; H04N 17/04; H04N 7/01; G06T 3/0006; G06T 2210/22; G09G 2340/04; G09G 2340/0492; G09G 2340/0407

USPC ............... 348/180, 189, 441; 382/154, 296; 345/649, 656, 659, 698

See application file for complete search history.

(56) References Cited

U.S. PATENT DOCUMENTS

2007/0058044 A1* 3/2007 Pedeville ............... H04N 17/04
348/189
2013/0307995 A1* 11/2013 Nakata ................ H04N 9/3194
348/189

\* cited by examiner

*Primary Examiner* — Sherrie Hsia
(74) *Attorney, Agent, or Firm* — Ziegler IP Law Group, LLC

(57) ABSTRACT

There are disclosed various methods, apparatuses and computer program products for testing a display. In some embodiments an image sensor captures a rendered image from the display to form a captured image, the image sensor having a second resolution greater than the first resolution. The captured image is analyzed to find difference of orientation of the rendered image with respect to an orientation of the image sensor. A rotated image is formed on the basis of the analyzed difference of orientation to obtain orientation for the rotated image to correspond with the orientation of the image sensor. The rotated image is resampled to form a resampled image having the first resolution.

18 Claims, 4 Drawing Sheets

DISPLAY INSPECTION

TECHNICAL FIELD

The present invention relates to a method for testing a display. The invention also relates to an apparatus for testing a display. The invention further relates to computer program product for testing a display.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Apparatuses and methods have been developed for testing devices having a display without opening the device or connecting any measuring equipment to the device. Such apparatuses may capture frames of the display with an image sensor. The image sensor may be a sensor having imaging elements in a matrix form or in a line (a single raw of sensors, a line-scan camera). Captured frame information is then analyzed to determine the quality of video playback. In some methods a certain area of the display is used to display a frame indicator. The frame indicator is for example a square which is shown as a white square by every other frame and as a black square by every other frame. Hence, the area can be imaged at intervals wherein the frame rate can be detected on the basis of the frequency of the varying black and white squares. However, such systems are only capable of testing a receiving device but are not capable of testing a transmission path from a sending device to the receiving device.

Therefore, there is a need to find an improved method, system and apparatus in which display properties of a device may be more reliably performed.

In this context the term frame is one set of visual information in matrix form to be shown by a display. The frame may be a part of a video content i.e. one frame of a sequence of frames, a picture, etc. The term dropped frame or an omitted frame means a frame of a sequence of frames which is not displayed by the display due to errors in capturing, transmission, reception and/or displaying. The reason for dropping the frame may be, for example, that the capturing device is not fast enough, a transmission path has not enough bandwidth or is not error prone, an input buffer of a receiving device or the display is full, the device controlling the display is occupied by other simultaneous tasks etc. The frame may also be called as an image in this application.

SUMMARY

One aim of the present invention is to provide an improved method and apparatus for testing display properties of a device. Testing of display properties of a device means in this context e.g. testing the performance of a display of a device, graphic processor of the device etc.

Some embodiments provide a method for testing a display. In some embodiments an image sensor captures a rendered image from the display to form a captured image, the image sensor having a second resolution greater than the first resolution. The captured image is analyzed to find difference of orientation of the rendered image with respect to an orientation of the image sensor. A rotated image is formed on the basis of the analyzed difference of orientation to obtain orientation for the rotated image to correspond with the orientation of the image sensor. The rotated image is resampled to form a resampled image having the first resolution.

Various aspects of examples of the invention are provided in the detailed description.

According to a first aspect, there is provided a method for testing a display capable of showing images at a first resolution, the method comprising:

capturing by an image sensor a rendered image from the display to form a captured image, said image sensor having a second resolution greater than the first resolution;

analyzing the captured image to find difference of orientation of the rendered image with respect to an orientation of the image sensor;

forming a rotated image on the basis of the analyzed difference of orientation to obtain orientation for the rotated image to correspond with the orientation of the image sensor; and resampling the rotated image to form a resampled image having the first resolution.

According to a second aspect, there is provided an apparatus for testing a display capable of showing images at a first resolution, the apparatus comprising at least one processor; and at least one memory including computer program code the at least one memory and the computer program code configured to, with the at least one processor, cause the apparatus to perform at least the following:

capture by an image sensor a rendered image from the display to form a captured image, said image sensor having a second resolution greater than the first resolution;

analyze the captured image to find difference of orientation of the rendered image with respect to an orientation of the image sensor;

form a rotated image on the basis of the analyzed difference of orientation to obtain orientation for the rotated image to correspond with the orientation of the image sensor; and resample the rotated image to form a resampled image having the first resolution.

According to a third aspect, there is provided a computer readable storage medium stored with code thereon for use by an apparatus, which when executed by a processor, causes the apparatus to perform:

capture by an image sensor a rendered image from the display to form a captured image, said image sensor having a second resolution greater than the first resolution;

analyze the captured image to find difference of orientation of the rendered image with respect to an orientation of the image sensor;

form a rotated image on the basis of the analyzed difference of orientation to obtain orientation for the rotated image to correspond with the orientation of the image sensor; and resample the rotated image to form a resampled image having the first resolution.

The device under test may be, for example, a mobile phone, a tablet computer, a working plane of a robot, a tool, a piece of paper, some other object to be visually analyzed, etc.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF SOME
EXAMPLE EMBODIMENTS

Figure 1:
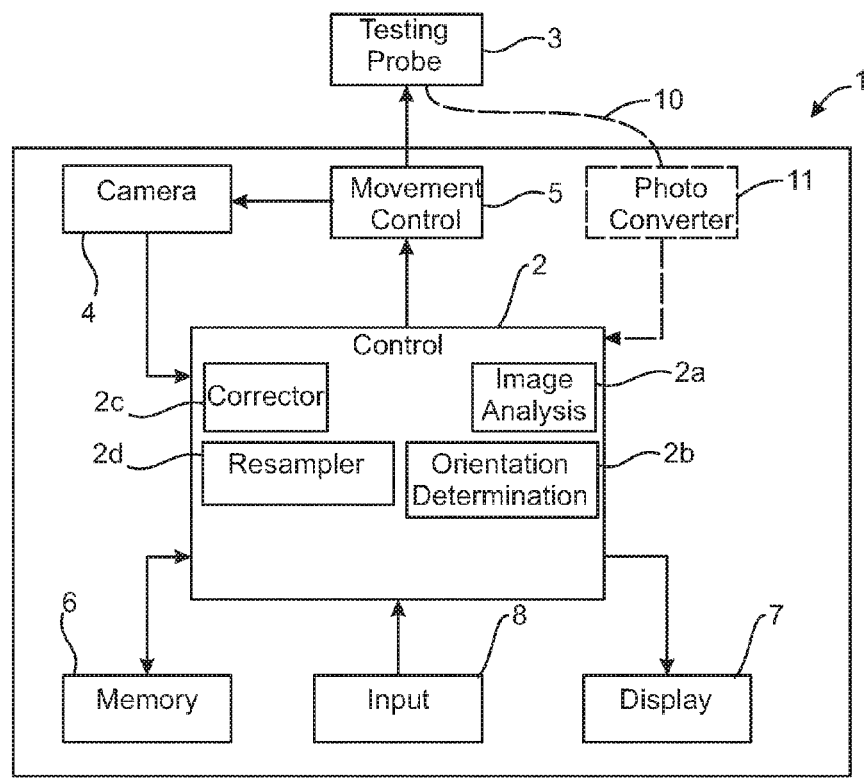
FIG. 1 is a simplified block diagram of a testing apparatus according to an example embodiment.
Figure 3:
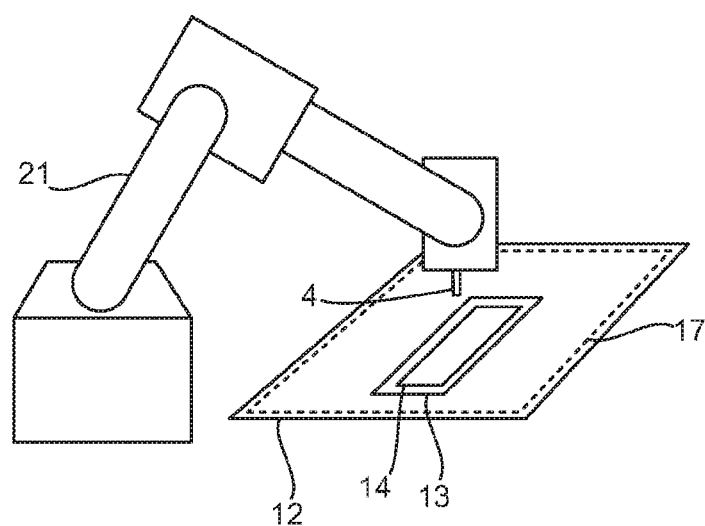
FIG. 3 depicts an example of a setup for testing a device.
Figure 4:
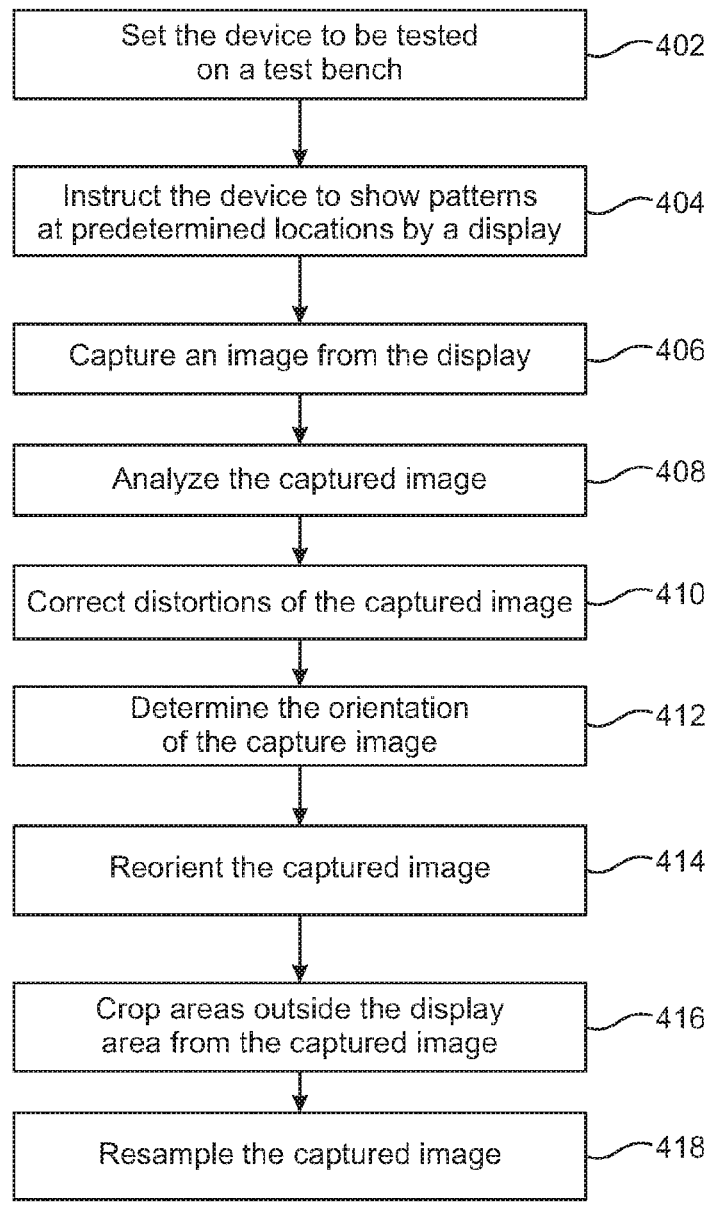
FIG. 4 shows a flow diagram of a method according to an example embodiment.

In the following some example embodiments will be described. FIG. 1 is a simplified block diagram of a testing apparatus 1 according to an example embodiment of the present invention and FIG. 4 is a flow diagram of a method according to an example embodiment of the present invention. The testing apparatus 1 comprises a control block 2, which is adapted to control the operation of the testing apparatus 1. The testing apparatus 1 also comprises a camera 4 intended to capture images during testing a device under test. The camera 4 may be attached with a testing probe 3 or may be separate from the testing probe 3. It should be noted that the testing apparatus 1 may not need to have the testing probe 3 especially when the testing apparatus 1 is not intended to emulate touches of a user. The camera 4 may be fixed or may be movable, wherein movements of the camera 4 may be achieved by a robotic arm 21, for example (FIG. 3), or by some other means. The testing apparatus 1 may comprise an camera movement controller 5 which may provide signals to linear motors or other corresponding elements of the robotic arm 21 so that the camera 4 can be moved as desired and accurately enough for image capturing purposes. The robotic arm 21 may also comprise an encoder (not shown) which provides information of the location of the camera 4 to the camera movement controller 5. Hence, the camera movement controller 5 may get feedback from the encoder to determine the actual location of the camera 4. The robotic arm 21 may have two, three or more degrees of freedom. The testing apparatus 1 may further comprise memory 6 for storing data and/or computer code for operating the testing apparatus 1, a display 7 for displaying information to a user of the testing apparatus 1, and input means 8 such as a keyboard, a pointing device, etc. for receiving instructions from the user.

The control block 2 may comprise an image analyzer 2a for analyzing captured images, an orientation detector 2b for determining the location and orientation (a.k.a. a pose) of the display of the device under test, a corrector 2c for correcting the captured image, and a resampler 2d for resampling the captured and/or corrected image. These elements may be implemented e.g. as a computer code, by hardware or a combination of both.

In the following, an embodiment of testing of a display of a device will be described in more detail with reference to the testing setup depicted in FIG. 3 and the flow diagram of FIG. 4. It is assumed that in this embodiment the camera 4 is in a fixed position during the testing wherein the camera 4 is not moved. However, similar principles presented below may be applicable with some other embodiments in which the camera 4 may be movable.

The device 13 to be tested is set 402 on a test bench 12. It is assumed here that it is not necessary to accurately put the device 13 in a certain location but it may be sufficient that the device is within a certain area. The dotted line 17 in FIG. 3 illustrates an example of such area. The device 13 may then be instructed 404 to show (render) an image by a display 14 of the device 13. The rendered image may be a uniform, one color field, an image comprising one or more patterns, or another kind of image which makes it possible to find out the area of the display 14 in which visible information can be presented. This area may be called as a display area in this context. In accordance with an embodiment the rendered image is a rectangle the corners of which are presented near the edges of the display area. The camera 4 is instructed to capture 406 an image of the display 14. The resolution of an image sensor of the camera 4 should be as high as the resolution of the display 14, but preferably the resolution of the image sensor of the camera 4 is higher than the resolution of the display 14. For example, the resolution of the image sensor of the camera 4 is at least twice the resolution of the display 14 in both vertical and horizontal direction, or if a line-scan camera is used, in one direction which is perpendicular to the moving direction of the line-scan camera. It is assumed here that the testing apparatus 1 is aware of the resolution of the display 14. This information may, for example, be entered by the testing personnel when s/he is conducting the test.

The image analyzer 2a analyzes 408 the captured image to find out whether the image displayed by the display 14 is distorted and in what way. For example, the display 14 may render images so that edges of rectangles become curved either inwards (so called pillow distortion) or outwards (so called barrel distortion). The image analyzer 2a may further analyze e.g. whether the displayed image is uniform in uniform display areas or if a so called flat field correction is needed. Also other distortions may be detected by the image analyzer 2a. Results of the analyzes process may be provided to the corrector 2c for correcting 410 the captured image. The corrector 2c may straighten the lines in the captured image which are known to be straight lines in the original image which the device under test has rendered. Also the flat field correction may be based on information of areas in the original image which should be rendered as flat areas.

Figure 2A:
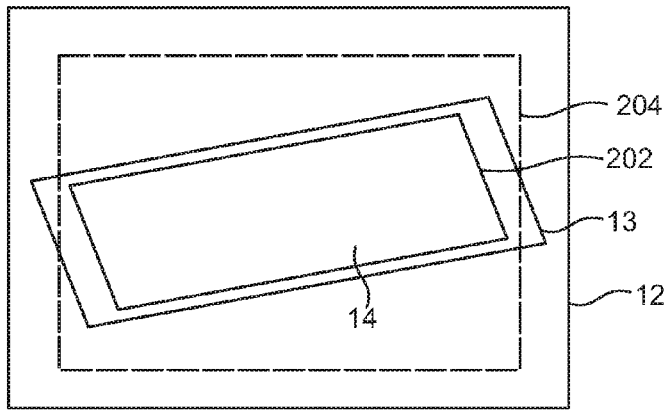
FIG. 2a illustrates an example situation in which an orientation of a display is different than an orientation of an imaging area of an imaging sensor of a camera, in accordance with an example embodiment.

The corrected image may then be provided to the orientation detector 2b which may determine 412 the orientation of the image. This may be performed, for example, by searching, for example, corners of the display area and/or edges of the display area or by using some other information. FIG. 2a illustrates an example situation in which the orientation 202 of the display is not the same than the orientation of the imaging area 204 of the imaging sensor of the camera 4.

When the orientation of the captured image has been detected, the captured image may be rotated 414 so that the orientation of the captured image becomes straight with reference to the imaging area of an image sensor of the camera 4. Furthermore, areas outside of the captured image may be cropped 416 and left away from further processing.

Now, the captured image may be resampled 418 by the resampler 2d to a resolution which corresponds with the original resolution of the image rendered by the display 14 of the device 13 under test. Resampling may comprise filtering, dropping pixels, interpolation and/or some other method. As an example, if the reconstructed image has twice the resolution of the display 14 the resampling may be performed by dropping every other pixel or taking an average of two adjacent pixels of the reconstructed image which then represent one pixel of the resampled image.

It should be noted that the order of the above described steps may be different from the above. For example, the orientation of the captured image may be detected and corrected before searching possible distortions in the image.

Results of the above describe procedures may reveal possible errors in the operation of the display and/or some properties which may be typical and allowable for certain devices. For example, some devices may be intentionally made by using lower quality components for e.g. decreasing the production costs of the device. Hence, the testing apparatus may not indicate such features as errors and passes the device from the test.

In accordance with an embodiment, a sensitivity map, a heat map or some other kind of reference information may be utilized in the test to indicate the acceptable properties of the display. The For example, the reference information may indicate areas in which lower quality is allowed and possible limits for the lower quality areas. If the test indicates that the quality of that particular area is still better than the limit indicates, the display may pass the test whereas if there is one or more areas in which the tested quality remains below the limit, the testing apparatus 1 may indicate that the display has failed the test. The testing apparatus 1 may also indicate the cause of the failure, e.g. the area of the display which did not pass the test.

Figure 5:
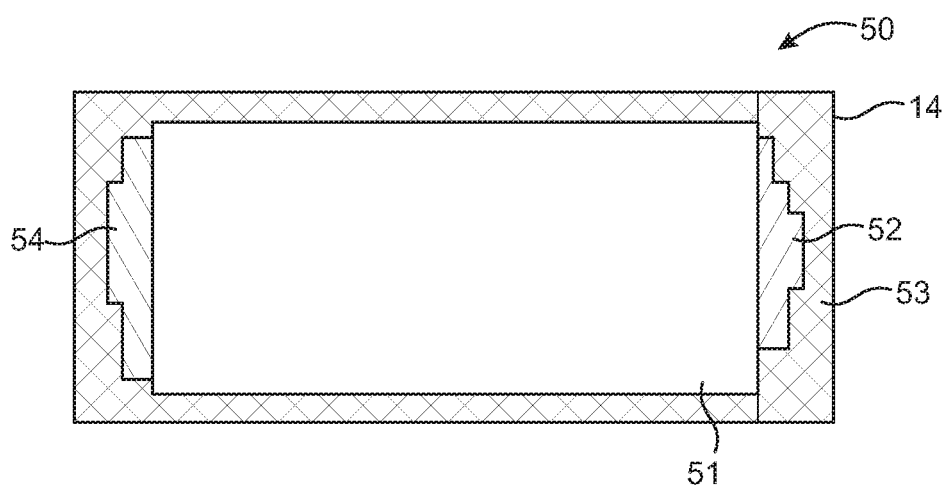
FIG. 5 shows an example of a sensitivity map, in accordance with an example embodiment.

FIG. 5 illustrates an example of a sensitivity map 50 in a simplified manner. Regions 51, 52, 53, 54 illustrate some exemplary sensitivity areas of pixels of the display so that different shadings illustrate different sensitivity values for the pixels within the regions 51, 52, 53, 54. For clarity, individual pixels are not shown in the figure.

When the corrected image is reconstructed e.g. by resampling the corrected image to the resolution of the display 14 the reconstruction may take into account the subpixel structure of the display. Each pixel on a color display is actually composed of individual red, green, and blue or other color subpixels. A single pixel on a color display having a set of subpixels may be made of several color primaries, typically three colored elements which are ordered in a particular order, such as blue, green, and red (BGR), or as red, green, and blue (RGB). Some displays may have more than three primaries, such as a combination of red, green, blue, and yellow (RGBY), or red, green, blue and white (RGBW). These pixel components, sometimes called subpixels, appear as a single color to the human eye because of blurring by the optics and spatial integration by nerve cells in the eye.

Subpixel rendering is a method which may be used to increase the apparent resolution of a display or to reconstruct the image so that subpixels of the image are formed in the same order than in the display 14 of the device 13 under test. In other words, pixels are rendered so that physical properties of the display are taken into account.

The testing apparatus 1 should be aware of the subpixel structure of the display 14. This may be indicated to the testing apparatus 1, for example, by providing a menu in which several alternatives are shown, entering by a keyboard of the testing apparatus, selecting a testing configuration on the basis of the manufacturer, model etc. of the device 13, downloading the information or configuration from the manufacturer's web page or by some other appropriate method.

The sensitivity map may be used to adjust sensitivity of the testing process to properties of the display 14 at different areas of the display 14. For example, on the one hand the testing apparatus 1 may accept brighter illuminated pixels at corners of the display than in the middle of the display when a lower quality displays are tested, and on the other hand, hand the testing apparatus 1 may require less variations in brightness throughout the display area when a higher quality displays are tested.

In accordance with an embodiment, the testing apparatus 1 may take into consideration previous tests performed for certain devices when testing a similar device. In other words, the testing apparatus 1 may learn how certain devices behave and use that information in the future so that certain properties specific to that kinds of devices would not cause that the device fails the test unless the tested properties are worse than the specific properties. As an example, if it has been detected that a certain area of the display 14 of the device 13 has lower quality than other areas but still acceptable, the sensitivity of the test may be lowered at this area when other similar devices will be tested.

In accordance with an embodiment an optical fiber 10 or a bunch of optical fibers 10 may also be used with the testing apparatus 1. The optical fiber 10 may move along the camera and/or along the testing probe 3, if it exists. Hence, the fiber 10 can be used, for example, to obtain color information, illumination information and/or other information from the display 14 at the location of the fiber 10. This information may be used, for example, to obtain information related to uniformity of image formed by the display.

Figure 2B:
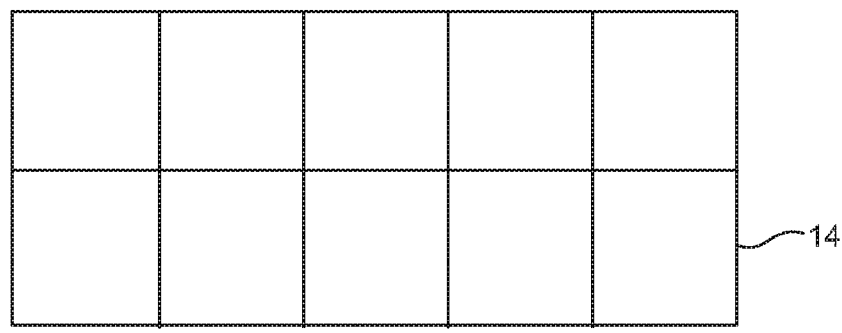
FIG. 2b illustrates an example of a display area divided into smaller areas, in accordance with an example embodiment.

In the above it was explained how a whole display area may be tested at once. However, the invention may also be implemented so that the display area is tested in smaller pieces e.g. by capturing one image of one part of the display area, performing the above described image processing operations to that image, providing test results for that display area, moving the camera 4 to capture another part of the display area, capturing another image, performing the above described image processing operations to that image, providing test results for that another part of the display area, moving the camera 4 to capture yet another part of the display area, etc. until the whole display area or a determined section of the display area has been analyzed. FIG. 2b illustrates an example of a display area divided into smaller areas. This kind of partial and repetitive process may enable testing of large displays so that the camera 4 need not be able to view the whole image area at once. Therefore, the camera 4 may be brought nearer to the surface of the display 14 which also may improve the accuracy of the captured images with reference to the resolution of the display i.e. smaller details may be visible in the captured imaged compared to a situation in which the camera is farther away from the display.

Reconstructed partial images may be combined to one image after the whole display area or the display are to be analyzed has been processed.

Figure 2C:
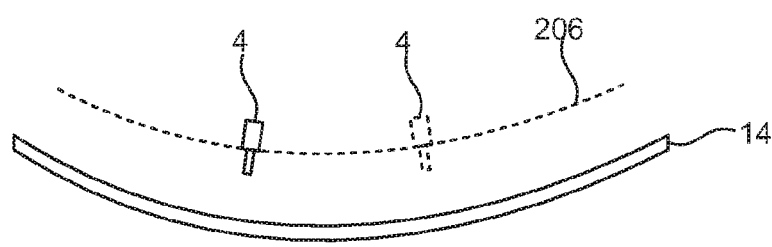
FIG. 2c illustrates an example of a curved display, in accordance with an example embodiment.

The partial and repetitive process may also enable testing of displays having different shapes. For example, displays may not always be rectangular but may have another shape. Also displays which are not flat but are e.g. curved also exist wherein to be able to move the camera so that it is always substantially parallel to the normal of the surface of the display (i.e. is perpendicular to the tangent of the display at the location where an image is captured) may improve the reliability of the tests. FIG. 2c illustrates an example of a curved display viewed from above and the dotted line 206 illustrates a possible movement track of the camera 4.

In the following some examples will be provided.

According to a first example, there is provided a method for testing a display capable of showing images at a first resolution, the method comprising:

capturing by an image sensor a rendered image from the display to form a captured image, said image sensor having a second resolution greater than the first resolution;

analyzing the captured image to find difference of orientation of the rendered image with respect to an orientation of the image sensor;

forming a rotated image on the basis of the analyzed difference of orientation to obtain orientation for the rotated image to correspond with the orientation of the image sensor; and resampling the rotated image to form a resampled image having the first resolution.

In some embodiments the analyzing comprises detecting two or more corners of the rendered image to find out the orientation of the rendered image In some embodiments the analyzing comprises:

examining the captured image to detect distortions in the rendered image.

In some embodiments the method further comprises:

correcting the captured image to eliminate detected distortions.

In some embodiments said correcting comprises one or more of:

spatial correction;

flat field correction;

subpixel rendering.

In some embodiments the method further comprises:

cropping out areas of the captured image which represent information which is outside of the rendered image.

According to a second example, there is provided an apparatus for testing a display capable of showing images at a first resolution, the apparatus comprising at least one processor; and at least one memory including computer program code configured to, with the at least one processor, cause the apparatus to perform at least the following:

capture by an image sensor a rendered image from the display to form a captured image, said image sensor having a second resolution greater than the first resolution;

analyze the captured image to find difference of orientation of the rendered image with respect to an orientation of the image sensor;

form a rotated image on the basis of the analyzed difference of orientation to obtain orientation for the rotated image to correspond with the orientation of the image sensor; and resample the rotated image to form a resampled image having the first resolution.

According to a third example, there is provided a computer program product for testing a display capable of showing images at a first resolution, the computer program product stored on a tangible medium with code thereon for use by an apparatus, which when executed by a processor, causes the apparatus to:

capture by an image sensor a rendered image from the display to form a captured image, said image sensor having a second resolution greater than the first resolution;

analyze the captured image to find difference of orientation of the rendered image with respect to an orientation of the image sensor;

form a rotated image on the basis of the analyzed difference of orientation to obtain orientation for the rotated image to correspond with the orientation of the image sensor; and resample the rotated image to form a resampled image having the first resolution.

The invention claimed is:

1. A method for testing a display capable of showing images at a first resolution, the method comprising:

capturing by an image sensor a rendered image from the display to form a captured image, said image sensor having a second resolution greater than the first resolution;

analyzing the captured image to find difference of orientation of the rendered image with respect to an orientation of the image sensor;

forming a rotated image on the basis of the analyzed difference of orientation to obtain orientation for the rotated image to correspond with the orientation of the image sensor; and resampling the rotated image to form a resampled image having the first resolution.

2. The method of claim 1, said analyzing comprising:

detecting two or more corners of the rendered image to find out the orientation of the rendered image.

3. The method of claim 1, said analyzing comprising:

examining the captured image to detect distortions in the rendered image.

4. The method of claim 3 further comprising:

correcting the captured image to eliminate detected distortions.

5. The method of claim 4, said correcting comprising one or more of:

spatial correction;

flat field correction;

subpixel rendering.

6. The method of claim 1 further comprising:

cropping out areas of the captured image which represent information which is outside of the rendered image.

7. An apparatus for testing a display capable of showing images at a first resolution, the apparatus comprising at least one processor; and at least one memory including computer program code configured to, with the at least one processor, cause the apparatus to perform at least the following:

capture by an image sensor a rendered image from the display to form a captured image, said image sensor having a second resolution greater than the first resolution;

analyze the captured image to find difference of orientation of the rendered image with respect to an orientation of the image sensor;

form a rotated image on the basis of the analyzed difference of orientation to obtain orientation for the rotated image to correspond with the orientation of the image sensor; and resample the rotated image to form a resampled image having the first resolution.

8. The apparatus of claim 7, said at least one memory including computer program code configured to, with the at least one processor, cause the apparatus to perform:

detecting two or more corners of the rendered image to find out the orientation of the rendered image.

9. The apparatus of claim 7, said analyzing comprising computer program code configured to, with the at least one processor, cause the apparatus to perform:

examining the captured image to detect distortions in the rendered image.

10. The apparatus of claim 9, said at least one memory including computer program code configured to, with the at least one processor, cause the apparatus to perform:

correcting the captured image to eliminate detected distortions.

11. The apparatus of claim 10, said correcting comprising computer program code configured to, with the at least one processor, cause the apparatus to perform:
spatial correction;
flat field correction;
subpixel rendering.

12. The apparatus of claim 7, said at least one memory including computer program code configured to, with the at least one processor, cause the apparatus to perform:
cropping out areas of the captured image which represent information which is outside of the rendered image.

13. A computer program product for testing a display capable of showing images at a first resolution, the computer program product stored on a tangible medium with code thereon for use by an apparatus, which when executed by a processor, causes the apparatus to:
capture by an image sensor a rendered image from the display to form a captured image, said image sensor having a second resolution greater than the first resolution;
analyze the captured image to find difference of orientation of the rendered image with respect to an orientation of the image sensor;
form a rotated image on the basis of the analyzed difference of orientation to obtain orientation for the rotated image to correspond with the orientation of the image sensor; and
resample the rotated image to form a resampled image having the first resolution.

14. The computer program product of claim 13 including computer program code configured to, with the at least one processor, cause the apparatus to perform:
detecting two or more corners of the rendered image to find out the orientation of the rendered image.

15. The computer program product of claim 13, said analyzing comprising computer program code configured to, with the at least one processor, cause the apparatus to perform:
examining the captured image to detect distortions in the rendered image.

16. The computer program product of claim 15 including computer program code configured to, with the at least one processor, cause the apparatus to perform:
correcting the captured image to eliminate detected distortions.

17. The computer program product of claim 16, said correcting comprising computer program code configured to, with the at least one processor, cause the apparatus to perform:
spatial correction;
flat field correction;
subpixel rendering.

18. The computer program product of claim 13 including computer program code configured to, with the at least one processor, cause the apparatus to perform:
cropping out areas of the captured image which represent information which is outside of the rendered image.

* * * * *